(12) United States Patent
Martin et al.

(10) Patent No.: US 8,768,254 B2
(45) Date of Patent: *Jul. 1, 2014

(54) PROXIMITY-DEPENDENT EVENTS

(75) Inventors: Daryl Martin, Kitchener (CA); Ahmed E. Hassan, Waterloo (CA); Christopher David O'Keefe, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,507

(22) Filed: Aug. 10, 2012

(65) Prior Publication Data

US 2012/0302260 A1 Nov. 29, 2012

Related U.S. Application Data

(63) Continuation of application No. 11/756,675, filed on Jun. 1, 2007, now Pat. No. 8,285,206.

(51) Int. Cl.
*H04B 7/00* (2006.01)
(52) U.S. Cl.
USPC .................. 455/41.2; 455/456.3; 715/751
(58) Field of Classification Search
USPC ............... 455/41.2, 550.1, 404.2, 441, 456.1; 715/751
See application file for complete search history.

(56) References Cited

U.S. PATENT DOCUMENTS

| | | | |
|---|---|---|---|
| 6,920,328 B2 * | 7/2005 | Wollrab | 455/456.1 |
| 6,961,541 B2 * | 11/2005 | Overy et al. | 455/41.2 |
| 7,085,818 B2 * | 8/2006 | Brown et al. | 709/217 |
| 7,107,009 B2 * | 9/2006 | Sairanen et al. | 455/41.1 |
| 7,603,130 B2 * | 10/2009 | Anantha | 455/456.3 |
| 2005/0101335 A1 * | 5/2005 | Kelly et al. | 455/456.3 |
| 2005/0227712 A1 * | 10/2005 | Estevez et al. | 455/456.3 |
| 2006/0121912 A1 * | 6/2006 | Borjesson | 455/456.1 |
| 2006/0265263 A1 * | 11/2006 | Burns | 705/8 |
| 2007/0167136 A1 * | 7/2007 | Groth | 455/41.2 |
| 2008/0301567 A1 * | 12/2008 | Martin et al. | 715/751 |

FOREIGN PATENT DOCUMENTS

WO    WO 2006/108034    * 10/2006

OTHER PUBLICATIONS

Martin, Daryl, et al. "Proximity-Dependent Events", U.S. Appl. No. 11/756,675, filed Jun. 1, 2007.

* cited by examiner

*Primary Examiner* — Nay A Maung
*Assistant Examiner* — Angelica M Perez
(74) *Attorney, Agent, or Firm* — Perry + Currier Inc.

(57) ABSTRACT

A calendar application for use with a first portable electronic device includes time-dependent events having a start time and an end time and proximity-dependent events having a specified device ID that corresponds to a second portable electronic device. Both the time-dependent events and the proximity-dependent events are stored in the calendar application and the proximity-dependent event is convertible into a time-dependent event. A proximity reminder is generated when the second portable electronic device is in short range radio frequency communication range of the first portable electronic device.

17 Claims, 8 Drawing Sheets

Jun 3, 2003  10:08a     ◁ ▷

June
M  T  W  T  F  S  S 1  2
3  4  5  6  7  8  9
10 11 12 13 14 15 16
17 18 19 20 21 22 23
24 25 26 27 28 29 30

⎰ 9 : 00a Upcoming Projects
⎱10 : 00a
⎰11 : 00a Performance review
⎱12 : 00p    ( Room 2 )
  1 : 00p
  2 : 00p
⎰ 3 : 00p Interview ( Boardroom A )
⎱ 4 : 00p
  5 : 00p

Fig.5   PRIOR ART

New Appointment

Subject: Status review
Location: Room B

☐ All Day Event
Start:      Wed, Apr 10, 2002 9:00 AM
End:        Wed, Apr 10, 2002 10:00 AM
Duration:                1 Hour 0 Mins
Time Zone:        Eastern Time (-5)
Reminder:                    15 Min.

Recurrence:                      None
No Recurrence.

Notes:

Fig.6   PRIOR ART

New Proximity Event

User: John Smith
Device ID: xxxxxx.xxxx

Subject: XYZ conference
Location:
☐ All Day Event
Start:
End:
Duration:                0 Hour 0 Mins
Time Zone:        Eastern Time (-5)

Notes: Find out if John is attending
        the XYZ conference - if so
        discuss travel arrangements

Fig.7

| Upcoming Proximity Events |
|---|
| John Smith |
| Bob Cole |
| Jacky Jones |
| ⋮ |
| Jill Brown |

Fig.8

US 8,768,254 B2

PROXIMITY-DEPENDENT EVENTS

CROSS-REFERENCE TO RELATED APPLICATION

This application is a continuation of U.S. patent application Ser. No. 11/756,675, filed Jun. 1, 2007, the contents all of which are incorporated herein by reference.

FIELD

The present disclosure relates to proximity-dependent events, in particular, proximity-dependent reminders for wireless devices.

BACKGROUND

Many electronic devices such as desktop computers or mobile stations including simple cellular telephones, smart telephones, wireless personal digital assistants (PDAs), and laptop computers with wireless 802.11 or Bluetooth™ capabilities, include calendar or date-book applications for scheduling and reviewing time-dependent events such as appointments and meetings in a graphical user interface. The information relating to time-dependent events such as time, place and duration is saved as a time-dependent event and is viewable in the graphical user interface in various layouts such as a day view, a week view or a month view. Such applications are useful for maintaining a list of time-dependent events for a user, and audible or visible alerts are commonly employed for notifying or reminding the user of any or all of the events.

With many portable electronic devices such as cellular telephones, smart telephones, and wireless PDAs, time-dependent events can be created and saved using the calendar application of the portable electronic device. Time-dependent events can also be created and saved on another electronic device such as a desktop or laptop computer, using a calendar service application on the desktop computer. These time-dependent events can be synchronized or transferred to the portable electronic device by wired or wireless connection. Thus, the time-dependent events are stored at both the desktop computer and at the portable electronic device such that the time-dependent events at the electronic device mirror those at the desktop computer. This permits convenient viewing of the events using the calendar application at either the device or the desktop computer.

Mobile devices having Bluetooth capabilities have introduced the possibility of having both time-dependent events and proximity-dependent events. It would be advantageous to display time-dependent events and proximity dependent events in a single calendar application on a portable electronic device.

BRIEF DESCRIPTION OF THE DRAWINGS

The embodiments will be better understood with reference to the following Figures in which like numerals denote like parts and in which:

FIGS. 4, 5 and 6 are screen shots relating to time-dependent events in a calendar application of the portable electronic devices;

FIGS. 7 and 8 are screen shots relating to proximity-dependent events in the calendar application according to an embodiment;

DETAILED DESCRIPTION

In one aspect there is provided a calendar application for use with a first portable electronic device, the calendar application including:

time-dependent events having a start time and an end time, the time dependent events being stored in the calendar application;

proximity-dependent events stored in the calendar application, the proximity-dependent events including a specified device ID, the specified device ID corresponding to a second portable electronic device;

a proximity reminder generated when the second portable electronic device is in short range radio frequency communication range of the first portable electronic device; and wherein the proximity-dependent event is convertible into a time-dependent event.

Figure 1:
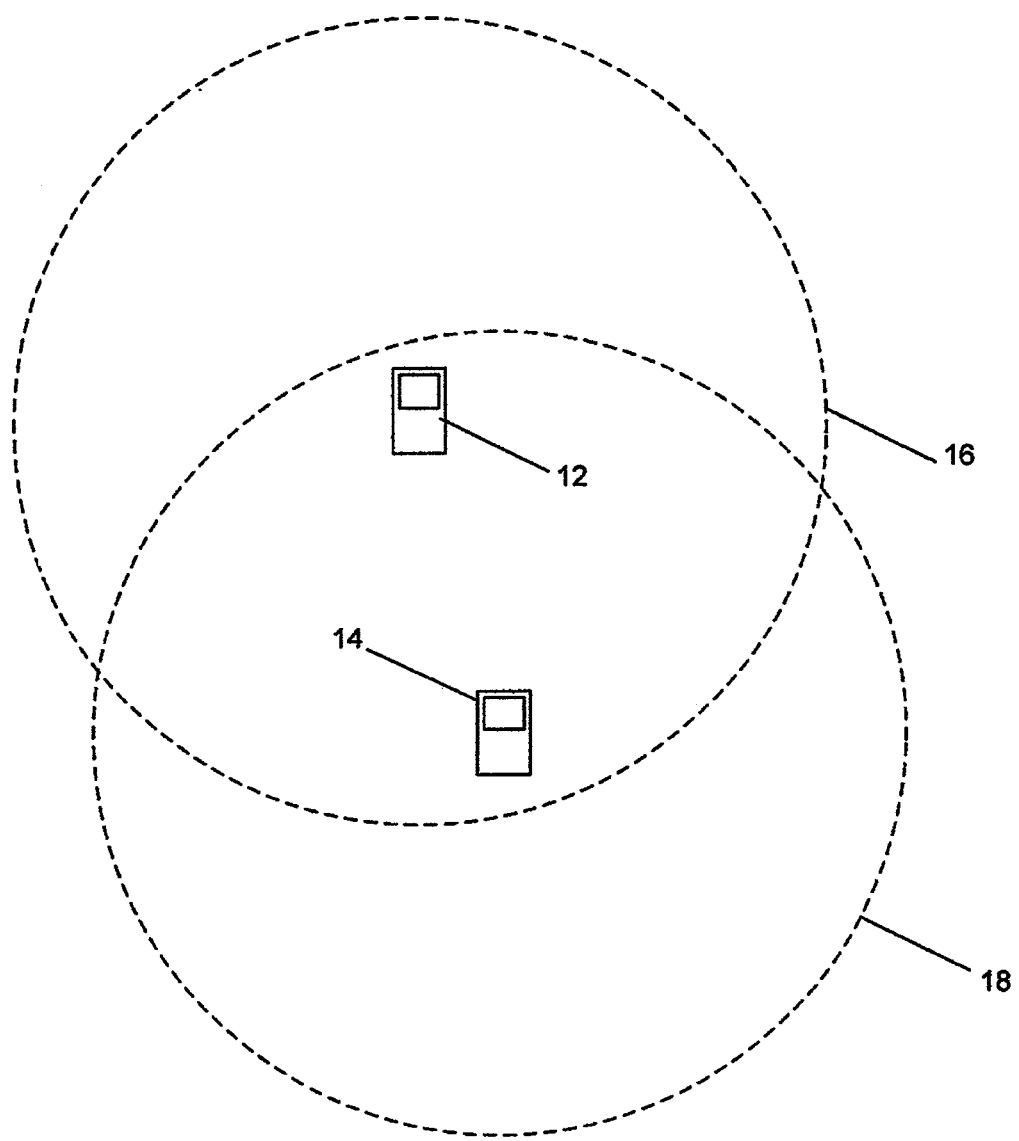
FIG. 1 is a schematic view of a first portable electronic device in short range radio frequency communication range with a second portable electronic device.

Referring to FIG. 1, a first portable electronic device 12 and a second portable electronic device 14 are generally shown. The portable electronic devices 12, 14 shown are exemplary devices that are based on the computing environment and functionality of a hand-held wireless communication device. It will be understood, however, that the portable electronic devices 12, 14 are not limited to a hand-held wireless communication device. Other portable electronic devices are possible, such as cellular telephones, smart telephones, and laptop computers, for example.

The portable electronic devices 12, 14 include Bluetooth™ technology for short range radio frequency (RF) voice and data communications. Coverage areas 16 and 18 for short range RF communications of first portable electronic device 12 and second portable electronic device 14, respectively, are indicated as circles centered on the devices 12, 14. Overlap area 20 indicates that the first portable electronic device 12 and the second portable electronic device 14 may communicate with one another. In addition, either device 12, 14 may communicate with any other Bluetooth™-enabled device that is located within its coverage area 16, 18.

The portable electronic devices 12, 14 are not limited to using Bluetooth™ technology. Other short-range radio frequency (RF) technologies such as induction wireless, infrared wireless, or ultra wideband, for example, may alternatively be used. If infrared wireless is used, line-of-sight communication is required between the portable electronic devices 12, 14.

Figure 2:
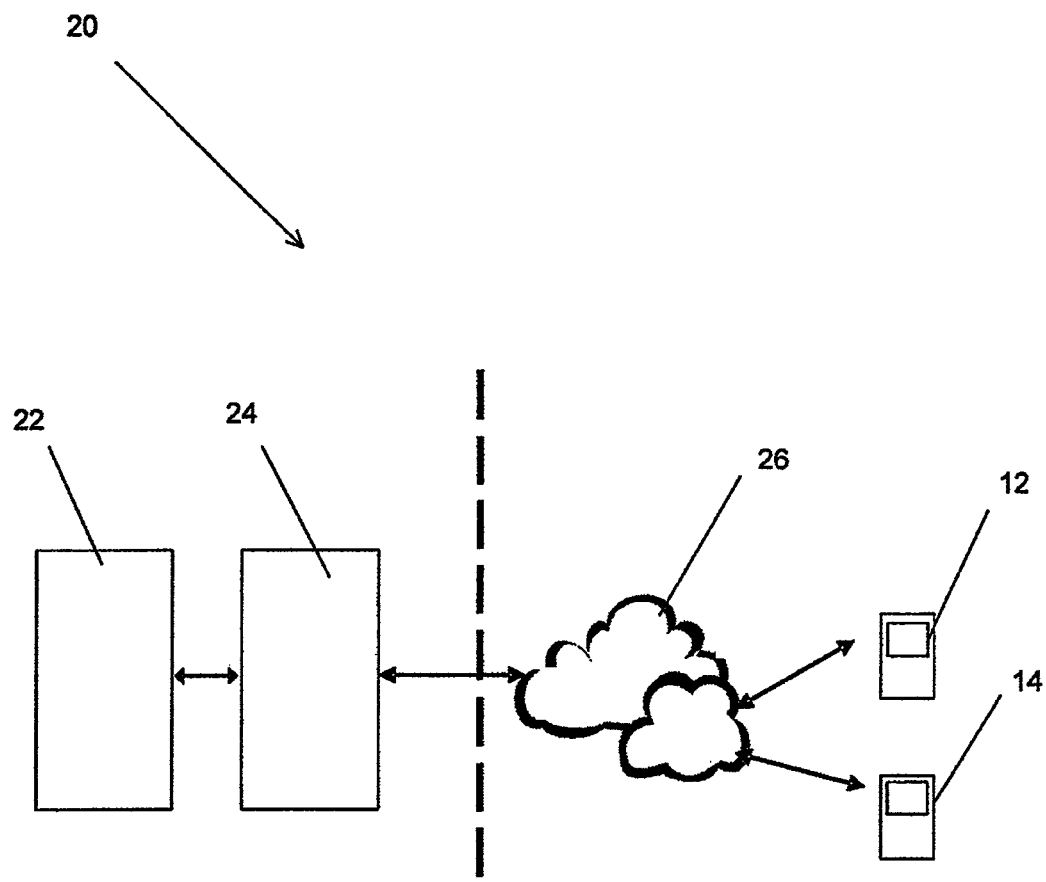
FIG. 2 is a schematic diagram of a wireless communication system of the first and second portable electronic devices of FIG. 1.

Referring to communication system 10 of FIG. 2, the portable electronic devices 12 and 14 are further operable to effect communications over a radio communications channel and communicate with a base station (not shown) while located within a coverage area that is defined by the base station. The base station is part of a wireless network that is in communication with the Internet 20. Data is delivered to the portable electronic devices 12, 14 via wireless transmission from the base station. Similarly, data is sent from the portable electronic devices 12, 14 via wireless transmission to the base station. A server 22 handles wireless client requests from the portable electronic devices 12, 14 and a firewall, or proxy server, 24, is provided between the server 22 and the Internet 26.

It will be appreciated that the portable electronic devices 12, 14 are movable within the coverage area of the base station and can be moved to coverage areas defined by other base stations. Further, as will be understood by one of ordinary skill in the art, wireless networks include GSM/GPRS, CDPD, TDMA, iDEN Mobitex, DataTAC networks, EDGE or UMTS and broadband networks including variants of 802.11.

Figure 3:
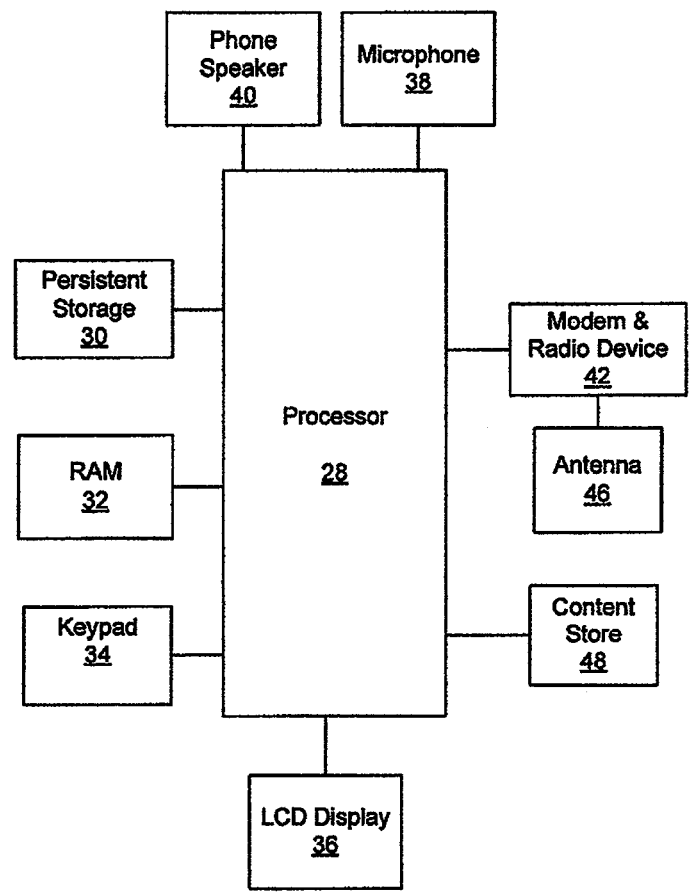
FIG. 3 is a block diagram of components of portable electronic devices according to an embodiment.

Referring to FIG. 3, a block diagram of certain components within the first portable electronic device 12 is shown. It will be appreciated that the second portable electronic device 14 includes similar components and therefore will not be described separately.

The first portable electronic device 12 is based on a microcomputer including a processor 28 connected to a persistent storage 30 and a random access memory unit (RAM) 32. In one embodiment, the persistent storage 30 is flash memory that contains a plurality of applications executable by the processor 28 that enables each portable electronic device 12 to perform certain functions including, for example, PIN message functions, SMS message functions and cellular telephone functions. The processor 28 receives input from various input devices including a keypad 34. The processor 28 outputs to various output devices including an LCD display 36. A microphone 38 and phone speaker 40 are connected to the processor 28 for cellular telephone functions. The processor 28 is also connected to a modem and radio device 42. The modem and radio device 42 is used to connect to wireless networks and transmit and receive voice and data communications through an antenna 44. A content store 46, which is generally a file storage system for the portable electronic device 12, is also provided.

The portable electronic devices 12, 14 include a Calendar application that is used for displaying and storing calendared events such as appointments, lectures, exams, movies, meetings, performances, dinners, ceremonies, etc., when executed by the processor 28. Each calendared event includes a variety of information including a date and time of the event.

Selection of the Calendar application on the LCD display 36 using a selection device such as a trackwheel (not shown), for example, causes the processor 28 to execute the Calendar application, providing a calendar user interface and displaying information relating to calendared events including meetings saved using the calendar application. This information can be selectively manipulated by and displayed to the user in various formats including monthly, weekly or daily schedules. FIGS. 4 and 5 show exemplary screen shots of monthly and weekly schedules, respectively. In the example of FIG. 5, there are three events including: an "Upcoming Projects" event from 9:00 a.m. until 10:00 a.m., a "Performance Review" from 11:00 a.m. until 12:00 p.m. and an "Interview" from 3:00 p.m. until 4:00 p.m.

Time-dependent appointments, such as those shown in FIG. 5 are created manually by the user or automatically in response to a meeting request from another party. A new appointment screen for composition of a new event for addition to the calendar display is shown in FIG. 6. As shown, the new appointment screen includes the event subject, the location, an indication as to whether or not the meeting is an all-day event, the start time, the end time, the duration, the time zone, a reminder setting, an indication of whether or not this is a recurring event and a field for entering notes relating to the event. For the exemplary meeting shown in FIG. 6, the subject is "Status Review" and the location is "Room B". The start time of the meeting is Wednesday, Apr. 10, 2002 at 9:00 a.m. and the end time is Wednesday, Apr. 10, 2006 at 10:00 a.m. Thus, the meeting duration is 1 hour. A reminder is set to remind the user of the meeting 15 minutes prior to the meeting.

Meeting requests appear as messages in a messaging application of the portable electronic device 12, 14. New appointments based on meeting requests are created by selecting an 'accept' option associated with the meeting request message. Once the meeting has been accepted, the device calendar and the desktop calendar are updated over the wireless network and a response message, which is sent to the meeting organizer, replaces the original meeting request message. Meeting details may be viewed by opening the response message or by opening the newly created calendar event in the calendar application.

According to an embodiment, a calendar application is provided for use with both time-dependent events and proximity-dependent events. Unlike time-dependent events, reminders for proximity-dependent events are generated based on proximity to another user. Such reminders will be generated when the other user is within short RF communication range.

Referring to FIG. 7, a screen shot of a new proximity-dependent event for addition to the calendar of the first portable electronic device 12 is shown. The proximity event includes a person field, a device ID field, fields relating to meeting details and a notes field. The device ID is the unique signature that is associated with the device.

In this example, the first portable electronic device 12 includes a proximity-dependent event for which the specified device ID corresponds to the second portable electronic device 14. When the second portable electronic device 14 is in a normal operating condition, its unique signature is broadcast continuously. The broadcast signal is received by the antenna 46 of the first portable electronic device 12 when it is broadcast range of the second portable electronic device 14. Upon receipt of the broadcast signal, the first portable electronic device 12 notifies the user with an auditory or vibratory reminder.

A screen shot showing a list of proximity dependent events that are stored in the calendar application is provided in FIG. 8. The list of proximity-dependent events is a view similar other views of the calendar application including month, week and day calendar formats. The list provides the user of the first portable electronic device 12 with a summary of all of the reminders that are waiting to be triggered. The user may view a pending proximity-dependent event by selecting the line and then selecting an open option.

Figure 9:
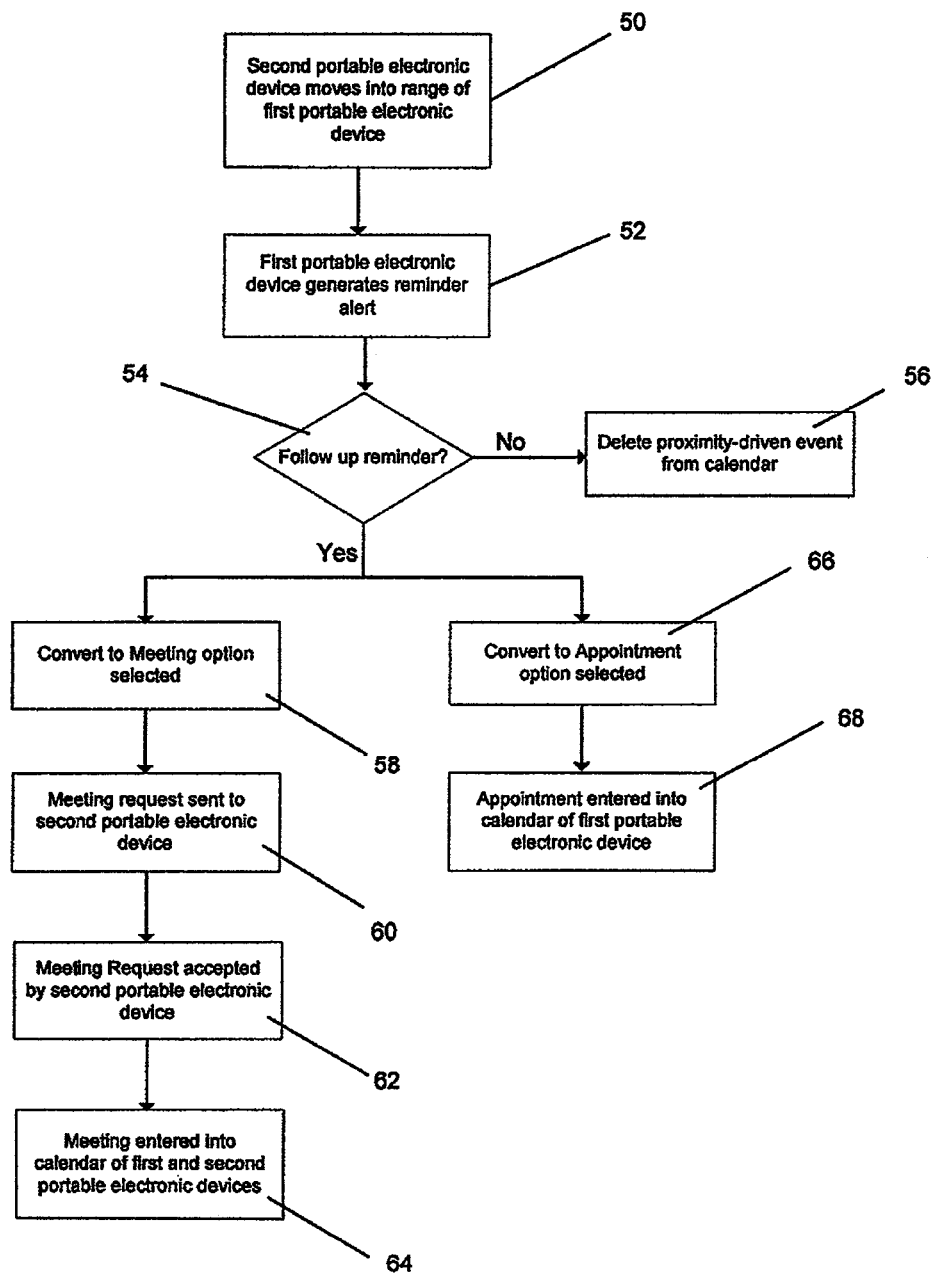
FIG. 9 is a flowchart showing a method of converting a proximity-dependent event into a time-dependent event according to an embodiment.

A method for generating time dependent events based on proximity-dependent events within the calendar application will now be described with reference to FIG. 9. When the first portable electronic device 12 and the second portable device 14, whose device ID corresponds to the device ID of the proximity-dependent event of FIG. 7, move into range of one another, the user of the first device 12 is alerted by the proximity-dependent event reminder, as indicated at steps 50 and 52. The user of the first portable electronic device 12 may then meet with the user of the specified device and discuss the subject of the reminder, which is the "XYZ conference" in the example of FIG. 7.

Once the user of the first portable electronic device 12 has met with the specified device user, the user determines whether or not the proximity-dependent event will be followed up with a meeting or an appointment, as indicated at step 54. In order to create the follow-up event, the user of the first portable electronic device 12 selects a meeting option or an appointment option from a menu of the proximity-dependent event within the calendar application. Alternatively, if the user of the first portable electronic device 12 has concluded discussions regarding the subject with the user of the second portable electronic device, the user selects a "no follow up" option and the proximity-dependent event is deleted from the calendar, as indicated at step 56. The "no follow up" option would be selected, for example, if John Smith was not attending the XYZ conference.

If the user selects the meeting option, the proximity-dependent event is converted into a meeting, as indicated at step 58. The meeting option would be selected if the users of the devices 12, 14 had decided to meet at a later time/date to discuss travel arrangements. When this option is selected, the calendar application converts the proximity-dependent event of FIG. 7 into a meeting request. Where possible, the meeting request is populated with information from the proximity-dependent event. For example, the user identified in the proximity-dependent event would be identified as a meeting attendee and the subject and the notes would be copied from the proximity-dependent event. The user of the first portable electronic device 12 would have to provide some information at the time the proximity-dependent event is being converted in order to populate fields that are not provided in the proximity-dependent event. For example, the time/date and location of the meeting. Also, if other attendees were to be invited, they would be added to the meeting request.

The meeting request is then sent to the second portable electronic device 14, as indicated at step 60. It will be appreciated that once the proximity-dependent event has been converted into a meeting request, the meeting request behaves like any other meeting request. Thus, once the meeting request has been accepted by the user of the second portable electronic device 14, as indicated at step 62, an appointment is automatically entered into the calendar of the second portable electronic device 14, as indicated at step 64. Sending and accepting meeting requests using calendar applications is well known in the art and therefore will not be discussed further here.

If the user selects the appointment option, the proximity-dependent event is converted into an appointment, as indicated at step 66. The appointment option would be selected if, for example, the user of the first portable electronic device 12 requires a reminder for a later time/date to book a seat on the confirmed flight of the user of the second portable electronic device 14. In this case there is no need to meet with the user of the second portable electronic device 14 again, however, the proximity-dependent event should be followed up with an appointment.

Similar to meeting requests, the appointment is populated with information from the proximity-dependent event where possible. Any additional information, such as the time of the appointment, is entered into the appointment by the user of the first portable electronic device 12 at the time of conversion. Once the appointment is populated with all of the desired information, the appointment is saved in the calendar application, as indicated at step 68.

Figure 10:
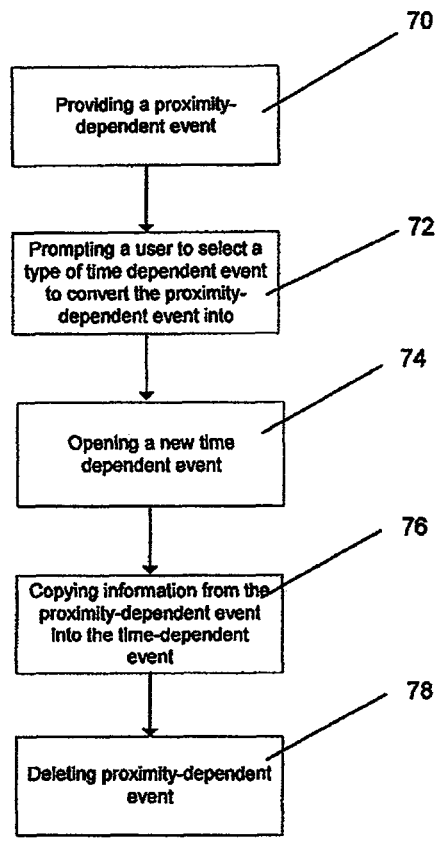
FIG. 10 is a flowchart showing device-side operation of the method of FIG. 9.

Referring to FIG. 10, device operation of the method for generating time dependent events based on proximity-dependent events within the calendar application will now be described. At step, 70 a proximity-dependent event is provided in the calendar application of the first portable electronic device 12. At step 72, the user is prompted to select a type of time-dependent event that the proximity-dependent event is to be converted into. As previously described, the user may select meeting or appointment. At step 74, a new time-dependent event of the type selected by the user is opened. Information from the proximity-dependent event is then copied into the time-dependent event, as indicated at step 76. Once the information has been successfully copied, the proximity-dependent event is deleted, as indicated at step 78.

In another embodiment, when the proximity-dependent event alerts the user of the proximity of the specified device ID, the user is able to view the calendar of the user of the specified device. By checking the calendar, the user would be able to determine if the user of the specified device is busy and, if so, for how long. As such, the user would not interrupt the specified user unnecessarily. It will be appreciated that in order for this embodiment to be employed, the user of the specified device would have to enable the public calendar on his/her device.

Device ID's for various users are stored in an address book application of the portable electronic device 12. The Device IDs may be manually entered into an appropriate field of an address book record or, alternatively, the portable electronic device 12 can scan for Bluetooth™-enabled devices in the vicinity and store the device IDs that correspond to contacts in their address book.

In another embodiment, the proximity of devices 12, 14 is determined by using Global Positioning System information that is collected and monitored by a central server. In this embodiment, the central server tracks the location of various portable electronic devices and stores proximity driven reminders that are generated by each portable electronic device. When the first portable electronic device 12 is within a set distance of the second portable electronic device 14, the central server searches for reminders that have been previously saved in relation to either of the portable electronic devices 12, 14. If a reminder that was generated by the first device 12 relating to the second device 14 and was previously saved at the central server, the reminder will be forwarded to the first device 12 when the distance between the devices 12, 14 is less than or equal to the set distance. It will be appreciated that in this embodiment, the set distance is unlimited. As long as the devices 12, 14 are in contact with the central server, the central server is able to determine the distance between the devices 12, 14 and forward reminders thereto.

In yet another embodiment, proximity-dependent reminders are not integrated into a calendar application. As such, the proximity-dependent reminders may be generated on a device that does not include a calendar application or alternatively, the proximity-dependent reminders may operate independently of a device calendar application.

Although portable electronic devices 12 and 14 are described as being similar, it will be appreciated by a person skilled in the art that the devices could be dissimilar. Any device having short range RF communication or GPS capability would be suitable such as a Palm Treo™ or Nokia™ cell phone, for example.

A specific embodiment has been shown and described herein. However, modifications and variations may occur to those skilled in the art. All such modifications and variations are believed to be within the sphere and scope of the present embodiment.

What is claimed is:

1. A method for generating time-dependent events based on proximity-dependent events in a calendar application of a portable electronic device, said method comprising:

providing a proximity-dependent event generated using said calendar application of said portable electronic device, said proximity-dependent event including a user field and a subject field;

prompting a user to select a type of time-dependent event from between a meeting request configured for inviting one or more other users and an appointment for only the user, the type of time-dependent event being that into which said proximity-dependent event is to be converted;

opening a new time-dependent event having said type when said portable electronic device is less than or equal to a set distance from a location defined by said proximity-dependent event;

copying said user field and said subject field from said proximity-dependent event into corresponding fields in said new time-dependent event; and deleting said proximity-dependent event in response to population of said corresponding fields in said new time-dependent event.

2. The method of claim 1 wherein the proximity-dependent event is generated when the portable electronic device is in proximity to a second portable electronic device, the second portable electronic device specified by the proximity-dependent event.

3. The method of claim 2 wherein the portable electronic device uses a short-range radio frequency to detect when the portable electronic device is in proximity to the second portable electronic device.

4. The method of claim 3 wherein the short-range radio frequency includes one of infrared wireless and ultra wideband.

5. The method of claim 2 wherein the portable electronic device is in proximity to a second portable electronic device when the portable electronic device receives a unique signature of the second portable electronic device.

6. The method of claim 2 further comprising sending the meeting request, by the portable electronic device, to the second portable electronic device.

7. The method of claim 1 further comprising the portable electronic device receiving a reminder from a server prior to the providing the proximity-dependent event.

8. The method of claim 1 further comprising receiving an input, at the portable electronic device, to populate the meeting request.

9. A portable electronic device comprising:
a processor of said portable electronic device configured to provide a proximity-dependent event generated using an application, the proximity-dependent event including at least one field, the processor further configured to:
provide a prompt to select a type of time-dependent event from between a meeting request configured for inviting one or more other users and an appointment for only the user, the type of time-dependent event being that into which said proximity-dependent event is to be converted;
open a new time-dependent event having the type of time-dependent event when said portable electronic device is less than or equal to a set distance from a location defined by said proximity-dependent event;
copy at least one of the at least one field from the proximity-dependent event into corresponding fields in the new time-dependent event; and delete the proximity-dependent event in response to population of said corresponding fields in said new time-dependent event.

10. The portable electronic device of claim 9, wherein the proximity-dependent event is generated when the portable electronic device is in proximity to a second portable electronic device, the second portable electronic device specified by the proximity-dependent event.

11. The portable electronic device of claim 10, the processor is configured to use a short-range radio frequency to detect when the portable electronic device is in proximity to the second portable electronic device.

12. The portable electronic device of claim 11, wherein the short-range radio frequency includes one of infrared wireless and ultra wideband.

13. The portable electronic device of claim 10 wherein the portable electronic device is in proximity to a second portable electronic device when the portable electronic device receives a unique signature of the second portable electronic device.

14. The method of claim 10, wherein the processor is further configured to send the meeting request to the second portable electronic device.

15. The portable electronic device of claim 9, wherein the processor is configured to provide the proximity-dependent event after the portable electronic device receives a reminder from a server.

16. The portable electronic device of claim 9, wherein the processor is further configured to receive input to populate the meeting request.

17. A method for generating time-dependent events based on proximity-dependent events in a calendar application of a portable electronic device, said method comprising:
providing a proximity-dependent event generated using said calendar application of said portable electronic device, said proximity-dependent event including a user field and a subject field;
prompting a user to select a type of time-dependent event from between a meeting request configured for inviting one or more other users and an appointment for only the user, the type of time-dependent event being that into which said proximity-dependent event is to be converted;
automatically opening a new time-dependent event having said type when said portable electronic device is less than or equal to a set distance from a location defined by the proximity-dependent event, and automatically copying said user field and said subject field from said proximity-dependent event into corresponding fields in said new time-dependent event; and
deleting said proximity-dependent event in response to successful population of said corresponding fields in said new time-dependent event.

* * * * *